United States Patent
Ikushima

(10) Patent No.: US 8,588,958 B2
(45) Date of Patent: Nov. 19, 2013

(54) MOVING PROGRAM MAKING-OUT PROGRAM AND DEVICE

(75) Inventor: Kazumasa Ikushima, Mitaka (JP)

(73) Assignee: Musashi Engineering, Inc., Mitaka-shi, Tokyo (JP)

( * ) Notice: Subject to any disclaimer, the term of this patent is extended or adjusted under 35 U.S.C. 154(b) by 752 days.

(21) Appl. No.: 12/676,461

(22) PCT Filed: Apr. 9, 2008

(86) PCT No.: PCT/JP2008/002429
§ 371 (c)(1),
(2), (4) Date: May 5, 2010

(87) PCT Pub. No.: WO2009/031305
PCT Pub. Date: Mar. 12, 2009

(65) Prior Publication Data
US 2011/0184544 A1 Jul. 28, 2011

(30) Foreign Application Priority Data

Sep. 4, 2007 (JP) ................................. 2007-229473

(51) Int. Cl.
*G06F 19/00* (2011.01)
*G05B 11/01* (2006.01)
*G05B 19/18* (2006.01)
*B25J 9/16* (2006.01)
*B25J 9/18* (2006.01)
*B25J 9/22* (2006.01)

(52) U.S. Cl.
USPC ............... 700/184; 700/17; 700/61; 700/188; 700/245; 700/250; 318/568.1; 318/568.11; 318/568.13; 901/3; 901/9; 901/23; 901/46

(58) Field of Classification Search
USPC ............... 700/17, 61, 86, 181, 182, 188, 245, 700/250; 318/568.1, 568.11, 568, 12, 318/568.13, 568.14, 568.15; 901/3, 9, 23, 901/46
See application file for complete search history.

(56) References Cited

U.S. PATENT DOCUMENTS 4,789,931 A   12/1988   Kuragano
5,744,081 A   4/1998   Tanigawa et al.
(Continued)

FOREIGN PATENT DOCUMENTS

EP    0258897 A2   3/1988
JP    2835392 B2   12/1998
(Continued)

OTHER PUBLICATIONS

Supplementary European Search Report dated Jul. 7, 2011, issued in corresponding European Patent Application No. 08829453.

(Continued)

*Primary Examiner* — Kavita Padmanabhan
*Assistant Examiner* — Darrin Dunn
(74) *Attorney, Agent, or Firm* — Westerman, Hattori, Daniels & Adrian, LLP

(57) ABSTRACT

A computer program product and an apparatus for preparing a moving program for controlling the operation of a working robot which can move a known working apparatus relative to a workpiece and which can perform desired work on the workpiece. Movement information of the working apparatus may be input to a text entry screen on a character basis. Movement information of the working apparatus may also be input via a figure entry screen as a path on a two-dimensional plane in correlation with height information. The movement information that is input on the text entry screen is output in real time as the path on the two-dimensional plane and the height information thereof on the figure entry screen. The movement information that is input on the figure entry screen is output in real time to the text entry screen on the character basis.

13 Claims, 8 Drawing Sheets

(56) References Cited

U.S. PATENT DOCUMENTS

| | | | |
|---|---|---|---|
| 6,167,328 A * | 12/2000 | Takaoka et al. | 700/264 |
| 2001/0001841 A1 | 5/2001 | Sugiyama et al. | |
| 2001/0018644 A1* | 8/2001 | Schwalb et al. | 703/7 |
| 2002/0158886 A1* | 10/2002 | Hallbauer et al. | 345/619 |
| 2004/0108992 A1* | 6/2004 | Rosenberg | 345/156 |
| 2005/0149231 A1* | 7/2005 | Pretlove et al. | 700/264 |
| 2005/0224479 A1* | 10/2005 | Watanabe et al. | 219/125.1 |
| 2006/0030970 A1* | 2/2006 | Watanabe et al. | 700/248 |
| 2006/0279576 A1* | 12/2006 | Pannese et al. | 345/474 |
| 2006/0287772 A1* | 12/2006 | Sandner et al. | 700/253 |
| 2008/0022264 A1* | 1/2008 | Macklem et al. | 717/136 |

FOREIGN PATENT DOCUMENTS

| | | |
|---|---|---|
| JP | 3397879 B2 | 4/2003 |
| JP | 2006-026861 A | 2/2006 |
| JP | 2007-242054 A | 9/2007 |
| WO | 97/11416 A1 | 3/1997 |

OTHER PUBLICATIONS

International Search Report of PCT/JP2008/002429, mailng date of Nov. 18, 2008.

* cited by examiner

| Step | Command | Data | |
|------|---------|------|---|
| 0001 | 07:CH. call | 101 CH 0 | |
| 0002 | 01:line | INC V=00 X:-0005.500 Y:+0000.000 Z: W: | |
| 0003 | 01:line | INC V=00 X:+0000.000 Y:+0007.000 Z: W: | |
| 0004 | 01:line | INC V=00 X:+0005.000 Y:+0000.000 Z: W: | |
| 0005 | 12:OUT | NO. 27:OFF (discharge) | |
| 0006 | 01:line | INC V=00 X:+0000.500 Y:+0000.000 Z: W: | |
| 0007 | 07:CH. call | 102 CH 0 | |
| 0008 | 00:movement | INC X:-0005.200 Y:-0003.500 Z: W: | 100 |
| 0009 | 07:CH. call | 101 CH 0 | |
| 0010 | 01:line | INC V=00 X:+0004.700 Y:+0000.000 Z: W: | |
| 0011 | 12:OUT | NO. 27:OFF (discharge) | |
| 0012 | 01:line | INC V=00 X:+0000.500 Y:+0000.000 Z: W: | |
| 0013 | 07:CH. call | 102 CH 0 | |

MOVING PROGRAM MAKING-OUT PROGRAM AND DEVICE

TECHNICAL FIELD

The present invention relates to a program and an apparatus for preparing a moving program for controlling the operation of a working robot which can move a known working apparatus relative to a workpiece and which can perform desired work on the workpiece. For example, the present invention relates to a program and an apparatus with the function of preparing a moving program for controlling the operation of an application apparatus which has a discharge port to discharge a liquid material and which discharges the liquid material through the discharge port such that the liquid material is applied to the workpiece.

It is to be noted that the term "work" used in the present invention primarily includes supply and application of the liquid material, screwing, soldering, assembly, mounting, etc.

BACKGROUND ART

One example of a working robot which can move a known working apparatus relative to a workpiece and which can perform desired work on the workpiece is a desktop orthogonal working robot in combination of an application apparatus and a means for moving the workpiece in XYZ-directions. With that type of working robot, the work is performed in accordance with a moving program that describes the path of movement of the working apparatus relative to the workpiece, the operation of the working apparatus, etc.

In order to efficiently perform the work with the working apparatus, the moving program requires to be optimized. However, whether or not a moving program input on the character basis (i.e., using characters, numerals, symbols, etc.) is optimum cannot be confirmed until the moving program is actually executed. In view of such a situation, various simulation techniques have been proposed to be able to verify the prepared moving program with no need of executing it.

Patent Document 1 discloses an application apparatus capable of automatically preparing a moving program to efficiently move an application head, in which a substrate (board) size is divided into a plurality of blocks and a simulation of a path for movement in a minimum time is performed on the basis of a designated block unit.

Patent Document 2 discloses an application apparatus for applying a coating onto a printed board through an application nozzle, the application apparatus having a simulation device in which application work is simulated onto the board displayed in the form of figures on a screen of a display device, the application work being based on data that is stored in a storage device and that is related to the application of the coating represented by data of the application position, the amount of the applied coating on the board, etc., the data being set in order of application steps.

Patent Document 1: Japanese Patent No. 2835392
Patent Document 2: Japanese Patent No. 3397879

DISCLOSURE OF THE INVENTION

Problems to be Solved by the Invention

In programming work of a moving program input on the character basis using characters, numerals, symbols, etc., propriety of the prepared moving program cannot be verified until the prepared moving program is executed on an actual apparatus or by simulation.

In practice of the programming work on the character basis, a diagram of the movement path of a working apparatus, etc. are prepared and the programming work is executed on the basis of the prepared diagram, etc. However, performing the work of preparing the diagram, etc. and the programming work in a separate way is not desired from the viewpoint of working efficiency. Thus, there is a demand for a working environment in which work of drawing a movement path diagram, etc. and the programming work can be performed in parallel.

On the other hand, the movement path diagram, etc. are usually performed on a two-dimensional plane, but work with the working apparatus is performed on a three-dimensional space. It is therefore required to add height information to two-dimensional information. Thus, there is a demand for a working environment in which the programming work can be performed while adding the height information at the same time.

In an actual working apparatus, a programming error in the height information is most critical. For example, application work is performed such that a discharge port and a workpiece positioned to face the discharge port are moved relatively to each other and a liquid material is drawn in a desired pattern on the workpiece. If the height information has an error in such application work, a nozzle contacts with the workpiece, whereby the nozzle and/or the workpiece may be damaged or broken.

As described above, there is a demand for a working environment in which the height information can be visually confirmed in the progress of the programming work.

An object of the present invention is to provide a working environment in which, when programming work of a moving program is executed, work of drawing a movement path diagram, etc. and the programming work can be performed in parallel and, in addition, height information can be visually confirmed.

Means for Solving the Problems

The inventor has accomplished the present invention with the view of enabling the programming work of the moving program to be performed while the movement path including the height information is visually confirmed.

More specifically, a first aspect of the present invention provides a program for preparing a moving program of a working robot which performs desired work by moving a holder holding a working apparatus and a workpiece relatively to each other, the program comprising a step of displaying a text entry screen on which movement information of the working apparatus can be input on the character basis, a step of displaying a figure entry screen on which movement information of the working apparatus can be input as a path on a two-dimensional plane in correlation with height information, a step of outputting in real time the movement information of the working apparatus, which has been input on the text entry screen, as the path on the two-dimensional plane and the height information thereof on the figure entry screen, a step of outputting in real time the movement information of the working apparatus, which has been input on the figure entry screen, to the text entry screen on the character basis, a step of displaying a 3D-display screen for outputting the movement information of the working apparatus, as a path on a three-dimensional space, on the basis of the movement information of the working apparatus which has been input on the text entry screen and/or the figure entry screen, and a step of automatically generating the input moving program for the working apparatus.

According to a second aspect of the present invention, the program according to the first aspect of the present invention further comprises a step of enabling the path on the three-dimensional space and a path, which is resulted from projecting the former path onto a two-dimensional plane, to be both simultaneously displayed on the 3D-display screen.

According to a third aspect of the present invention, the program according to the first or second aspect of the present invention further comprises a step of enabling the three-dimensional space displayed on the 3D-display screen to be rotated.

According to a fourth aspect of the present invention, the program according to the first, second or third aspect of the present invention further comprises a step of outputting in real time the movement information of the working apparatus, which has been input on the text entry screen and/or the figure entry screen, as the path on the three-dimensional space on the 3D-display screen.

According to a fifth aspect of the present invention, the program according to any one of the first to fourth aspects of the present invention further comprises a step of displaying, on the figure entry screen, the height information of the working apparatus at two end points constituting one selected path in the forms of a scale axis indicating a height and a figure held in linkage with the scale axis.

According to a sixth aspect of the present invention, the program according to the fifth aspect of the present invention further comprises a step of enabling the height information of the working apparatus to be changed by sliding the figure held in linkage with the scale axis.

According to a seventh aspect of the present invention, the program according to any one of the first to sixth aspects of the present invention further comprises a step of displaying desired image data as a background on the figure entry screen, and enabling the movement information of the working apparatus to be input on the displayed background.

An eighth aspect of the present invention provides an apparatus comprising a storage unit storing the program according to any one of the first to seventh aspects of the present invention, a display unit, an input unit, an information processing unit, and a data communication unit for transferring a prepared moving program to a working robot.

Herein, the data communication unit may communicate data via wired communication and/or wireless communication, or with the aid of a storage medium such as a flash memory.

Effect of the Invention

The present invention can provide a working environment in which, when the programming work of the moving program is executed, the work of drawing the movement path diagram, etc. and the programming work can be performed in parallel and, in addition, the height information can be visually confirmed.

DESCRIPTION OF REFERENCE CHARACTERS

Figure 1:
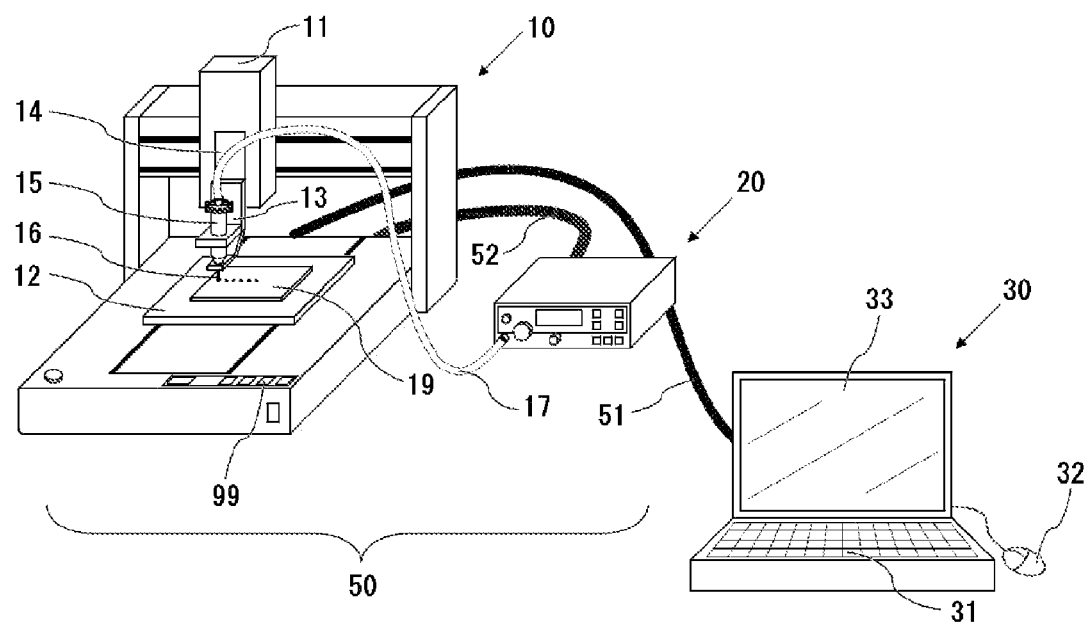
FIG. 1 illustrates the construction of an application apparatus which is operated with input of a moving program.

A legend of main reference characters used in the drawings is as follows:

10 application robot/11 moving head/12 table/13 syringe holder/14 elevating/lowering device/15 syringe/16 nozzle/17 pressure supply tube/18 discharge port/19 workpiece/20 dispenser controller/30 computer/31 keyboard/32 mouse/33 monitor/50 application apparatus/51 cable A/52 cable B/71 text entry screen/72 figure entry screen/73 3D display screen/74 project list screen/76 drawing input plane/80 movement line/81 drawing start point/82 end point A/83 end point B/84 end point C/85 drawing end point/86 drawing line A/87 drawing line B/88 drawing line C/89 drawing line D/90 Z-axial bar/100 moving program

BEST MODE FOR CARRYING OUT THE INVENTION

The present invention in the best mode resides in a program for preparing a moving program of a working robot which includes a holder for holding a known working apparatus, an information processing unit, and a storage unit, and which performs desired work by moving the holder and a workpiece relatively to each other in accordance with the moving program, the program comprising a step of displaying a text entry screen on which movement information of the working apparatus can be input on the character basis, a step of displaying a figure entry screen on which movement information of the working apparatus can be input as a path on a two-dimensional plane in correlation with height information, a step of outputting in real time the movement information of the working apparatus, which has been input on the text entry screen, as the path on the two-dimensional plane and the height information thereof on the figure entry screen, a step of outputting in real time the movement information of the working apparatus, which has been input on the figure entry screen, to the text entry screen on the character basis, a step of displaying a 3D-display screen for outputting the movement information of the working apparatus, as a path on a three-dimensional space, on the basis of the movement information of the working apparatus which has been input on the text entry screen and/or the figure entry screen, and a step of automatically generating the input moving program for the working apparatus. Preferably, the program includes a step of enabling the path on the three-dimensional space and a path, which is resulted from projecting the former path onto a two-dimensional plane, to be both simultaneously displayed on the 3D-display screen. More preferably, the program includes a step of enabling the three-dimensional space displayed on the 3D-display screen to be rotated.

The movement information of the working apparatus in the present invention means information regarding movements of the working apparatus and contains, for example, coordinate data, the shape of a movement path (e.g., linear, curved, or arc-shaped), and the moving speed of the working apparatus, though not limited to them.

The working apparatus in which the moving program prepared by using the program of the present invention is, for example, an application apparatus for discharging or applying a liquid from a nozzle or the like. However, the working apparatus practicing the present invention is not limited to the application apparatus, and other examples include a working apparatus for screwing, a working apparatus with such a means as picking up a part and mounting it to a workpiece, or a working apparatus which entails movements in directions closer to or away from a workpiece for confirmation of the depth of a bore formed by a drilling machine.

Details of the present invention will be described below in connection with embodiments, but the present invention is in no way restricted by the following embodiments.

Embodiment 1

A working apparatus on which a moving program 100 of Embodiment 1 runs is an application apparatus 50 for drawing a desired drawing pattern on a workpiece 19 while the workpiece 19 on an application robot 10 and a nozzle 16 are moved relatively to each other in accordance with the moving program 100.

As shown in FIG. 1, the application apparatus 50 is constituted by the application robot 10 and a dispenser 20. A computer 30 is connected to the application apparatus 50 through a cable A 51, and the application robot 10 and a dispenser 20 are connected to each other through a cable B 52.

Figure 2:
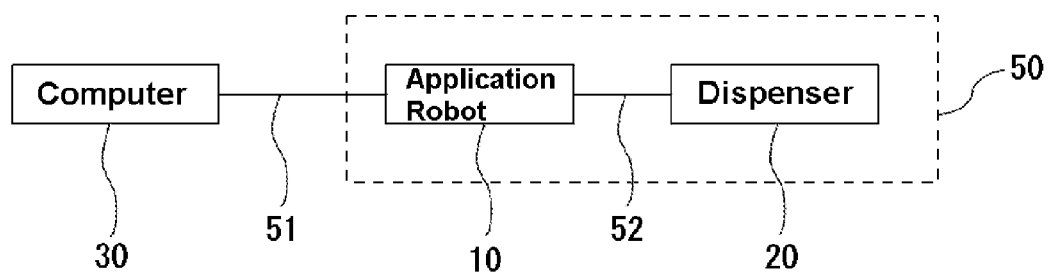
FIG. 2 is a block diagram showing the connecting relation among an application robot, a dispenser, and a computer.

FIG. 2 is a block diagram showing the relation in connecting among the application robot 10, the dispenser 20, and the computer 30.

The application robot 10 has a moving head 11 that is movable in the X-direction, and a table 12 that is movable in the Y-direction. The table 12 can hold the workpiece 19 placed on an upper surface of the table 12. Application work is performed by moving the moving head 11 and the table 12 relatively to each other.

The moving head 11 has a syringe holder 13 and an elevating/lowering device 14 capable of freely elevating and lowering the syringe holder 13 in the Z-direction. A syringe 15 filled with a liquid material is set onto the syringe holder 13. The syringe 15 has a tubular shape. The nozzle 16 having a discharge port 18 is fitted to one end of the syringe 15, and a pressure supply tube 17 is connected to the opposite end of the syringe 15 such that the syringe 15 is communicated with the dispenser 20 through the pressure supply tube 17.

The dispenser 20 can pressurize the liquid material in the syringe 15 through the pressure supply tube 17 to a desired pressure for a desired time.

The application apparatus 50 performs an operation of applying the liquid material in accordance with the moving program 100 stored in a storage unit within a control unit (not shown in the drawings) which is incorporated in the application robot 10. The moving program 100 is transferred from the computer 30 to the control unit through the cable A 51.

The control unit incorporated in the application robot 10 controls not only the application robot 10, but also the dispenser 20. Accordingly, the moving program 100 also contains commands for the dispenser 20. The control unit controls the amount of the liquid material discharged, etc. by transmitting the commands to the dispenser 20 through the cable B 52.

The computer 30 is a personal computer on which a universal OS runs. An adapted CAD program (not shown), i.e., an application program for preparing the moving program 100, is installed in a main storage device of the computer 30. Herein, the moving program 100 means control data or a control program for the application apparatus 50, which defines the movement path of the moving head 11 relative to the table 12, the amount of the liquid material discharged, etc., and it differs from a general application program.

The computer 30 is not limited to the lap top type shown in FIG. 1, and the computer 30 can also be any other suitable type so long as it includes an information processing unit, a storage unit, a display unit, and an input unit. The display unit may be constituted as an external unit, or it may be provided by constituting a monitor 33 as a multi-monitor. While a keyboard 31 or a mouse 32 is used as the input unit in this embodiment, it is needless to say that any other suitable input device, such as a track ball or a pen tablet, is also usable.

The adapted CAD program used in this embodiment has the function of easily drawing a line, a point, a circle, etc. at a desired position, and it can also serve as a universal CAD (Computer Aided Design or Computer Assisted Drawing).

Programming work by a user is performed using a text entry screen 71 and a figure entry screen 72. The user can describe the moving program 100 by inputting, from the keyboard 31, a command, etc. to the text entry screen 71 which is displayed on the monitor 33. Also, the moving program 100 can be automatically generated with the user drawing a figure on the figure entry screen 72, which is displayed on the monitor 33, by using the mouse 32.

The text entry screen 71 is a screen similar to a dialog box, for example, on which a desired command is input in the form a text (on the character basis) using characters, numerals, symbols, etc. The moving program 100 is described by inputting commands, etc. shown, by way of example, in FIG. 4.

The figure entry screen 72 is a screen for primarily inputting movement information of the application robot 10 as a desired movement path through a figure drawing step. By inputting a movement path shown in FIG. 3, for example, the moving program 100 is automatically prepared.

A plane displayed on the figure entry screen 72 corresponds to an X-Y plane on which the application robot 10 is operated. A pattern is drawn on the workpiece 19 with the progress of the application work in the same figure as per drawn on the figure entry screen 72. In other words, the liquid material discharged through the discharge port 18 of the nozzle 16 is applied to the workpiece 19 to draw a pattern while the moving head 11 is moved in the X-direction and the table 12 is moved in the Y-direction in accordance with the drawing pattern defined by the moving program 100.

Figures 3, 4:
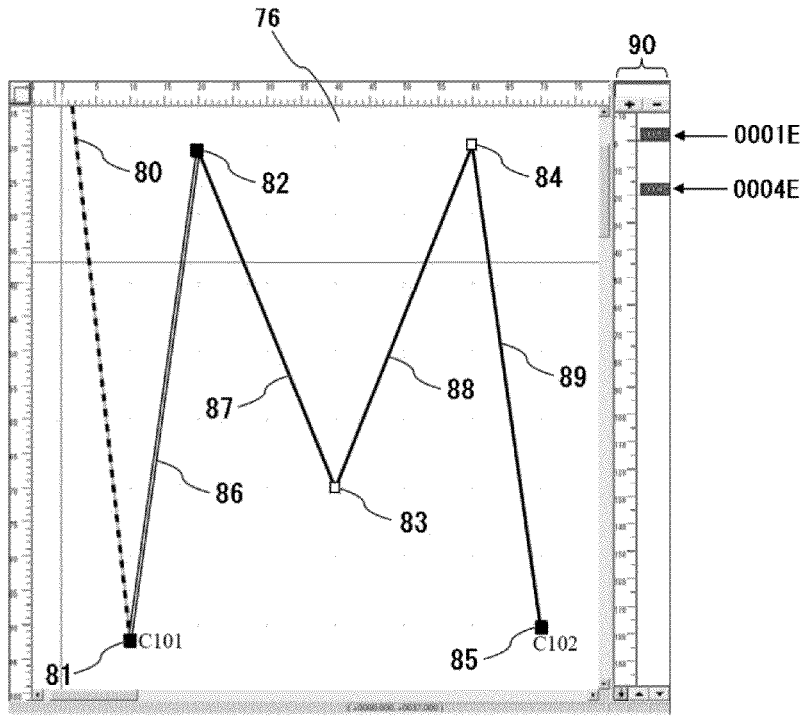
FIG. 3 illustrates a figure entry screen according to Embodiment 1.
FIG. 4 illustrates a text entry screen according to Embodiment 1.

FIG. 3 illustrates one example of the figure entry screen 72 and represents an input example where a pattern "M" is drawn. In the example of FIG. 3, the drawing is started from a drawing start point 81 at a lower left end of the pattern "M"

and is ended at a drawing end point 85 at a lower right end of the pattern "M". In FIG. 3, a movement line 80 indicated by a broken line on the left side represents a non-application drawing line along which the application robot 10 is moved without discharging the liquid material through the discharge port 18. A continuous line from the drawing start point 81 to the drawing end point 85 represents an application drawing line (application path).

While the movement line 80 is displayed as a broken line to be discerned as non-application drawing line in this embodiment, it may be displayed as any other suitable type of line or displayed in a color differing from that of the application drawing line for visual discrimination between both the lines.

In the adapted CAD program used in this embodiment, the text entry screen 71 and the figure entry screen 72 operate in linkage with each other in real time. More specifically, when a desired drawing pattern is input in the form of a figure on the figure entry screen 72, drawing commands are automatically displayed on the text entry screen 71 in a linked manner. Conversely, when commands for drawing a desired drawing pattern is described on the text entry screen 71, the desired drawing pattern is automatically drawn on the figure entry screen 72.

The text entry screen 71 and the figure entry screen 72 can be simultaneously displayed on the monitor 33. Further, since movement information of the working apparatus is output on each of both the entry screens in real time, the movement information of the working apparatus can also be input while the text entry screen 71 and the figure entry screen 72 are changed over from one to the other as required.

While the case of drawing the pattern "M" in the form of a character drawn by interconnecting linear lines has been described above, for example, with reference to FIG. 3, it is needless to say that a drawing pattern including curved lines can also be drawn for the application work through similar procedures in accordance with a drawing pattern prepared on the figure entry screen 72. Further, this embodiment is adaptable for not only the drawing using continuous lines, but also the drawing using dots. More specifically, when a dot is drawn for input on the figure entry screen 72, commands are automatically generated such that the nozzle 16 is lowered at the position where dot is drawn, and the nozzle 16 is elevated after the liquid material has been applied to the workpiece 19.

In the figure entry screen 72, drawing work is performed on a drawing input plane 76 which is a two-dimensional plane. The drawing input plane 76 corresponds to the X-Y plane on which the application robot 10 is operated. Stated another way, information in the Z-direction cannot be defined only by the drawing work on the drawing input plane 76. In this embodiment, therefore, a Z-axis bar 90 is displayed at the right end of the figure entry screen 72 so that a position in the Z-direction is represented to be editable.

The function of the Z-axis bar 90 is described in connection with the example of FIG. 3. The Z-axis bar 90 in FIG. 3 represents information in the Z-axis (i.e., the height information) when a linear line (double line) interconnecting the drawing start point 81 and the end point A 82 is drawn. More specifically, a rectangular figure displayed in the Z-axis bar 90, which has outline characters of "0001E", represents the Z-directional height of the nozzle 16 at the drawing start point 81, and a rectangular figure displayed including outline characters of "0004E" represents the Z-directional height of the nozzle 16 at the end point 82. Herein, the figures including the outline characters of "0001E" and "0004E" represent line numbers (step numbers) in the text entry screen 71, which command the respective Z-direction heights to facilitate the editing work on the text entry screen 71. The positions of the figures including the outline characters of "0001E" and "0004E" coincide with respective scale indicative values. Stated another way, the Z-axis bar 90 has a scale axis on the left side and the rectangular figures on the right side in order that an operator can recognize the Z-directional height of the selected drawing line at a glance depending on the position of each rectangular figure with respect to the scale axis. In the view of FIG. 3, the operator can easily read that the Z-directional height commanded by "0004E" is lower than the Z-directional height of commanded by "0001E".

The height information provided by the Z-axis bar 90 can be displayed in units of a selected drawing line. More specifically, a drawing line selected on the figure entry screen 72 is displayed in the form of a double line, and the Z-directional height of the selected drawing line is displayed in the form of a figure in the Z-axis bar 90. While a linear line of which Z-directional height is displayed in the Z-axis bar 90 is displayed in the form of a double line in this embodiment, the linear line may be displayed in a different color or in the different type of line, such as a dotted line or a broken line, for visual discrimination. The selected drawing line may be a curved line. In such a case, the Z-directional height at end points of the drawing line is displayed similarly to the case of a linear line.

In this embodiment, the information of the Z-directional height can be changed by dragging the line number, which is displayed in color in the Z-axis bar 90, with the mouse 32. More specifically, when the line number "0001E" is slid downwards, a value indicative of the Z-directional height, which is defined in the line "0001E" on the text entry screen 71, is reduced. Correspondingly, when the moving program 100 is executed, the distance between the nozzle 16 and the workpiece 19 is reduced (i.e., the amount of descent of the nozzle 16 is increased). Likewise, when the line number "0004E" is slid upwards, a value indicative of the Z-directional height, which is defined in the line "0004E" on the text entry screen 71, is increased (i.e., the amount of descent of the nozzle 16 is reduced).

While the procedure for changing the Z-directional height on the figure entry screen 72 has been described above, it is a matter of course that the value indicative of the Z-directional height can be directly edited on the text entry screen 71.

A background image can be displayed on the application drawing input plane 76. Any desired image data can be displayed as the background image. For example, Gerber data may be read in the background image. When Gerber data is read, it is preferable, for the purpose of facilitating the programming work, that character information, such as dimensional data, and information regarding hatching and filling-in, which are included in the Gerber data, are excluded from the target of the reading.

With the adapted CAD program used in this embodiment, a drawing pattern prepared in the programming work can be three-dimensionally displayed in various forms. The three-dimensional display function of the adapted CAD program will be described below in connection with the example of FIG. 3.

The drawing pattern, shown in FIG. 3, is moved in the Z-direction as follows. When the moving head 11 is moved from the drawing start point 81 to the end point A 82, the nozzle 16 draws a drawing line A 86 with the application of the liquid material while elevating. When the moving head 11 is moved from the end point A 82 to an end point B 83, the nozzle 16 draws a drawing line B 87 with the application of the liquid material while further elevating. When the moving head 11 is moved from the end point B 83 to an end point C 84, the nozzle 16 draws a drawing line C 88 with the application of the liquid material while lowering. When the moving head 11 is moved from the end point C 84 to the drawing end point 85, the nozzle 16 draws a drawing line D 89 with the application of the liquid material while further lowering.

Figure 5:
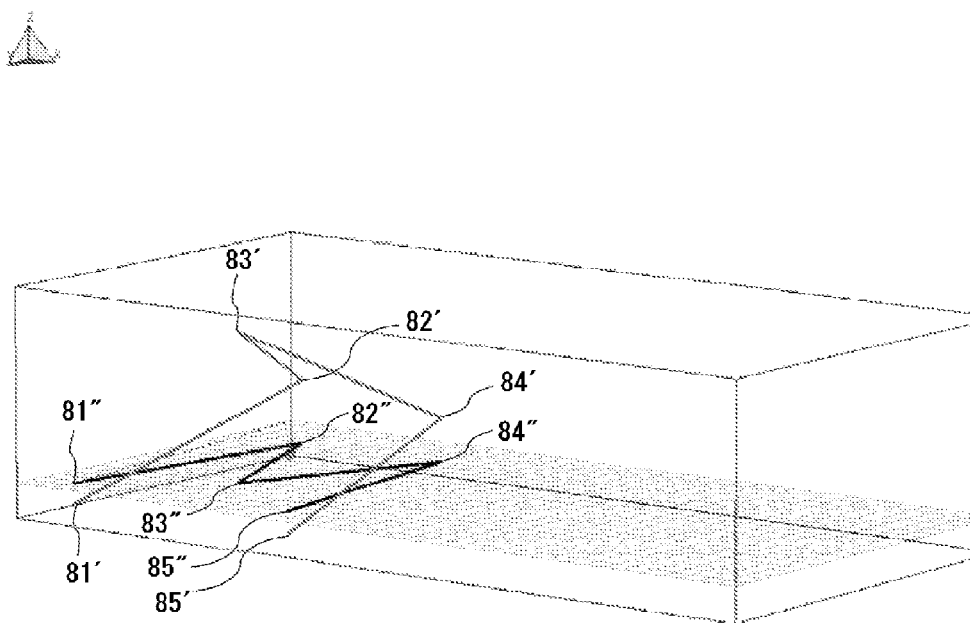
FIG. 5 illustrates one view form (XYZ-space) on a 3D display screen according to Embodiment 1.

FIG. 5 illustrates a view obtained by displaying, on a 3D display screen 73, the drawing pattern shown in FIG. 3 in which the nozzle 16 is moved in the Z-direction as described above.

In the 3D display screen 73, as shown in FIG. 5, a three-dimensional drawing pattern projected onto a space (XYZ-space) having information of the height direction (Z-direction) and a two-dimensional drawing pattern projected onto a plane (XY-plane) not having information of the height direction (Z-direction) (i.e., an X-Y plane projected figure) are displayed at the same time. More specifically, the three-dimensional drawing pattern having the information of the Z-direction is displayed as a figure formed by a continuous line extending from an end point 81' up to an end point 85' while passing points 82', 83' and 84' successively. The two-dimensional drawing pattern not having the information of the Z-direction is displayed as a figure formed by a continuous line extending from an end point 81" up to an end point 85" while passing points 82", 83" and 84" successively. Note that numerals affixed with prime (') and double prime (") on the 3D display screen 73 correspond to those used in FIG. 3.

The two-dimensional drawing pattern and the three-dimensional drawing pattern to be displayed on the 3D display screen 73 are displayed with the drawing lines having different colors for easier visual discrimination of the respective patterns. Alternatively, the two-dimensional drawing pattern and the three-dimensional drawing pattern may be displayed in different types of lines by using two among a double line, a dotted line, a broken line, etc. for visual discrimination between both the patterns.

Further, in this embodiment, visibility is improved by displaying a plane in the form of a mesh (or a grid) in which the two-dimensional drawing pattern is formed. Specifications are set such that although a default value for displaying a meshed plane is given by Z=0, the height of the meshed plane can be freely changed. It is also possible to offset the projected plane up and down.

While the plane in which the two-dimensional drawing pattern is formed is assumed to be a flat, the two-dimensional drawing pattern may be projected onto the workpiece displayed three-dimensionally. Such a projection is effective in aiding the work for preparing the drawing pattern because the operator can more easily confirm contact between the nozzle 16 and the workpiece 19.

Displaying a mesh-like view is not limited to the X-Y plane and can also be applied to an optionally selected two-dimensional plane.

Further, the two-dimensional drawing pattern and the mesh-like view may be switched over between display and non-display.

Thus, the 3D display screen 73 enables the operator to visually (on the view) confirm the operation of the nozzle 16 in the Z-direction, which cannot be confirmed with the figure entry screen 72, In work of inputting the position information of the working apparatus on the text entry screen 71 or the figure entry screen 72, the input position information can be displayed, as a movement path on a three-dimensional space, on the 3D display screen 73 of the monitor 33. Accordingly, the operator can perform the entry work while confirming the input position information as the path on the three-dimensional space. At that time, the input position information is preferably displayed as the path on the three-dimensional space in real time as soon as the information is input.

In addition, the text entry screen 71 and/or the figure entry screen 72 and the 3D display screen 73 can be preferably displayed on the monitor 33 at the same time. The reason is that visibility is improved and the entry work is facilitated.

The 3D display screen 73 is preferably set to be able to display the drawing pattern (drawing path) from any desired viewing point with operation of, e.g., the mouse 32. For example, rotating the displayed two-dimensional and three-dimensional drawing patterns with the mouse operation is disclosed herein. That function will be described below in connection with a practical example.

Other view forms with the adapted CAD program in this embodiment are now described.

The following description is made on an example of drawing the pattern of a character "M" with the application of the liquid material, in which each of the line from the end point 81 to the end point 83 and the line from the end point 84 to the end point 85 has a constant height, while the line from the end point 83 to the end point 84 is changed in height.

Figure 6:
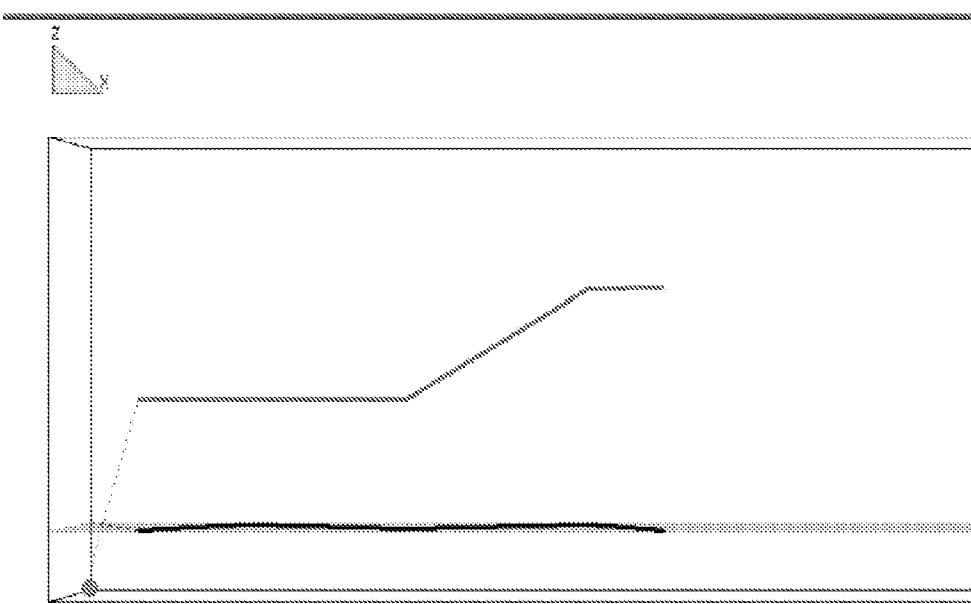
FIG. 6 illustrates one view form (X-Z-plane) on the 3D display screen according to Embodiment 1.

FIG. 6 illustrates a view form in which the 3D display screen is rotated and displayed in such a manner that the above drawing pattern is projected onto the X-Z plane. The view form of FIG. 6 enables the operator to visually confirm the movement path of the nozzle 16 in the Z-direction. That view form is effective, for example, when the workpiece 19 has a convex-concave surface.

Figure 7:
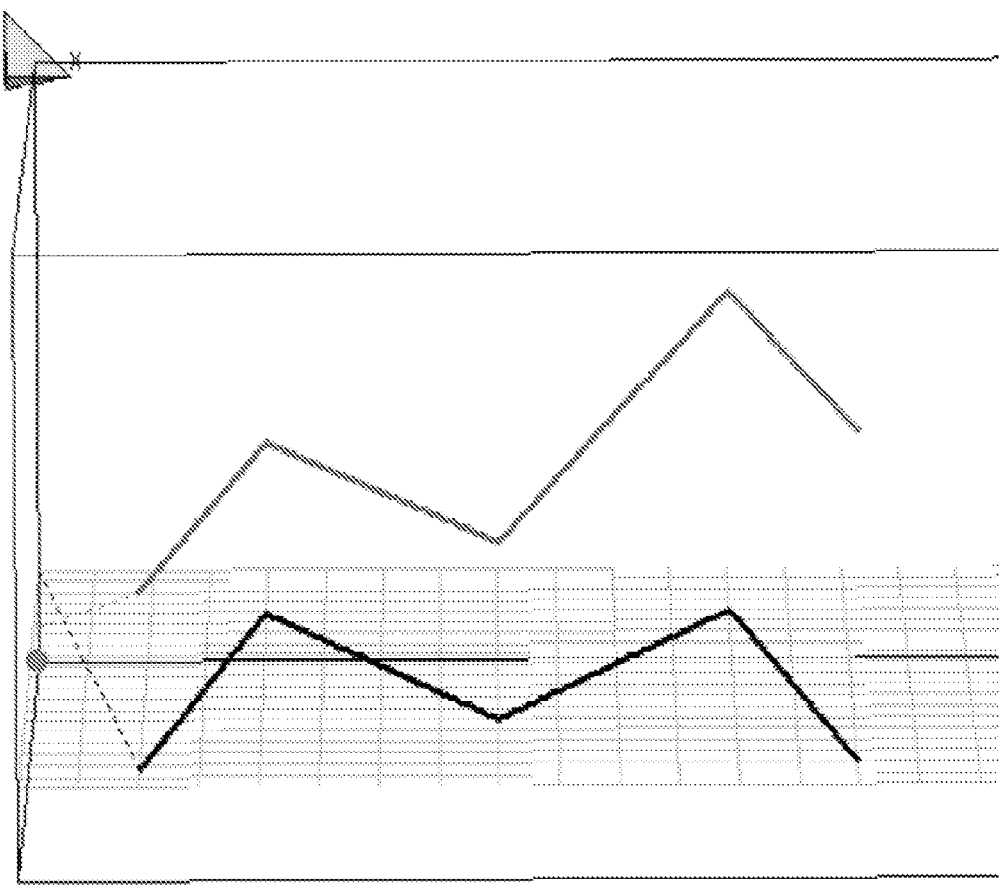
FIG. 7 illustrates one view form (XYZ-space) on the 3D display screen according to Embodiment 1.

Also, FIG. 7 illustrates a view form in which the same drawing pattern as that in FIG. 6 is three-dimensionally displayed. In FIG. 7, the three-dimensional drawing pattern and the two-dimensional drawing pattern are simultaneously displayed as in FIG. 5. As compared with FIG. 5, however, a three-dimensional space is rotated toward the front, i.e., the observer side, in the view form of FIG. 7.

Next, a description is made on an example of drawing the pattern of a character "M" with the application of the liquid material, in which the nozzle 16 is not moved in the height direction along the line from the end point 81 to the end point 85.

Figure 8:
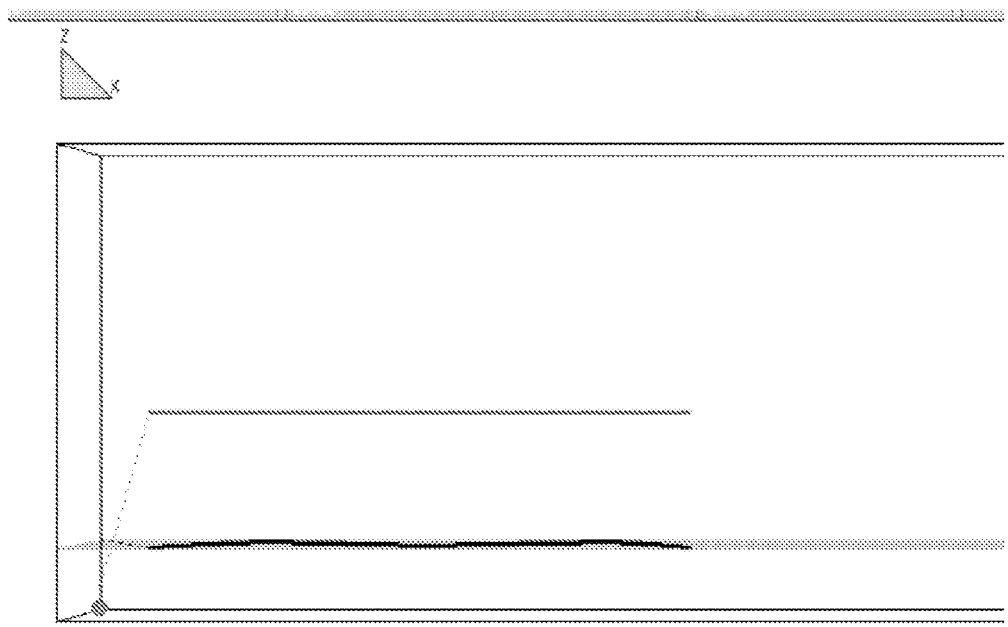
FIG. 8 illustrates a view form (X-Z-plane) on the 3D display screen for a drawing pattern with no displacement in the Z-direction.
Figure 9:
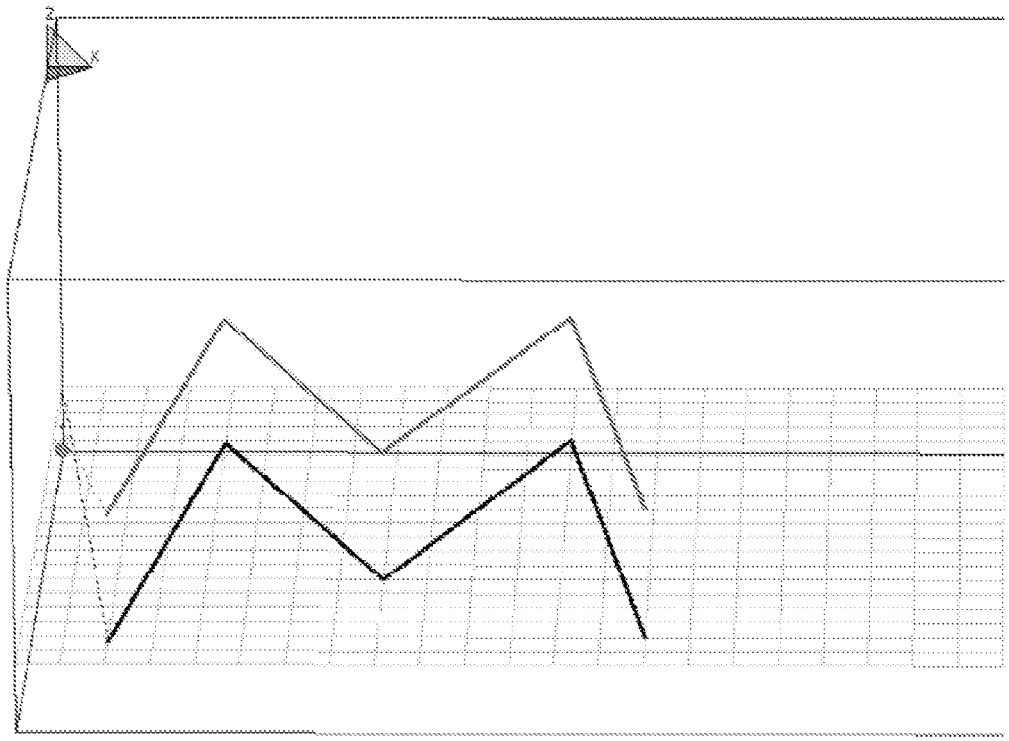
FIG. 9 illustrates a view form (XYZ-space) on the 3D display screen for the drawing pattern with no displacement in the Z-direction.

When the nozzle 16 is not moved or slightly moved in the height direction, an X-Y plane projected image is displayed as shown in FIG. 8. In a similar view form to that of FIG. 5, the two-dimensional drawing pattern and the three-dimensional drawing pattern are overlapped with each other and the drawing patterns cannot be stereoscopically confirmed. In such a case, by displaying the drawing patterns in the view form in which a three-dimensional space is rotated toward the front, i.e., in the view form of FIG. 9, similarly to FIG. 7, it is possible to stereoscopically confirm the two-dimensional drawing pattern and the three-dimensional drawing pattern. On that occasion, when the two-dimensional drawing pattern is displayed with Z=0, the interval between the two-dimensional drawing pattern and the three-dimensional drawing pattern represents the Z-directional height.

Figure 10:
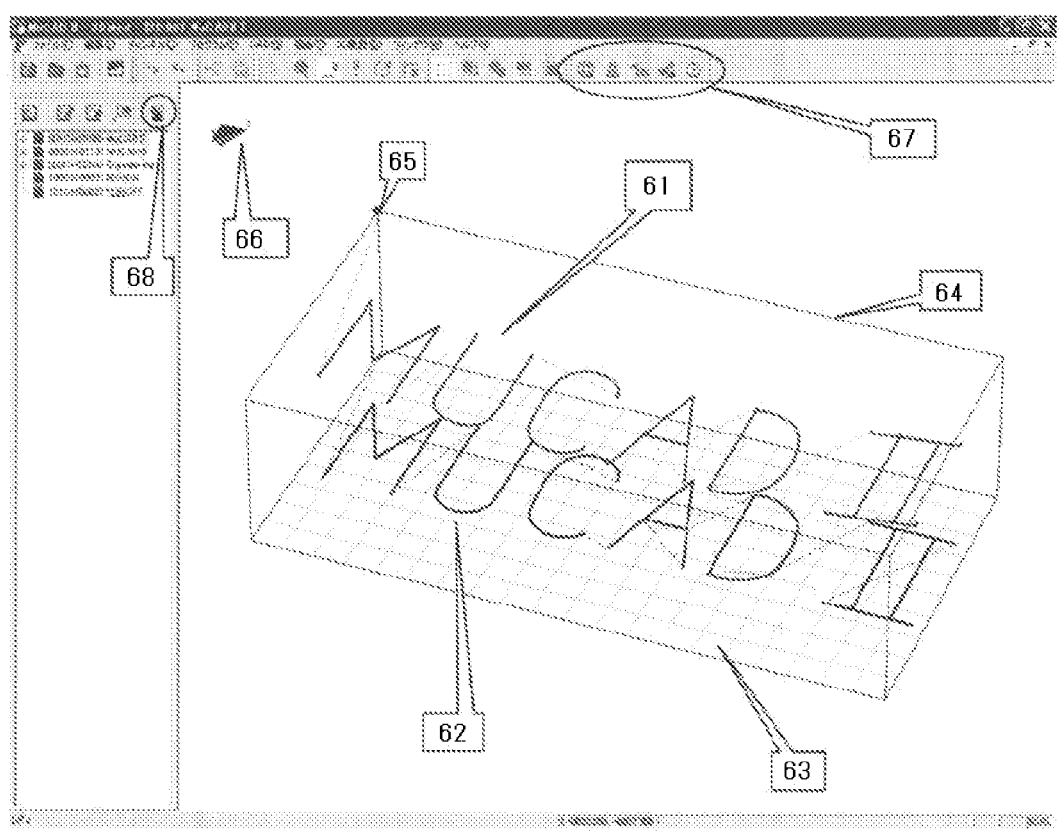
FIG. 10 illustrates a screen dump example of the 3D-display screen according to Embodiment 1.

FIG. 10 illustrates a screen dump example of the 3D-display screen 73 of the adapted CAD program in this embodiment.

Numeral 61 denotes a movement path (three-dimensional drawing pattern) of the nozzle 16, which is displayed in a three-dimensional space in accordance with the moving program 100 prepared on the text entry screen 71 or the figure entry screen 72. Numeral 62 denotes a projected line (two-dimensional drawing pattern) resulting from projecting the movement path, denoted by the numeral 61, onto a two-dimensional plane. Numeral 63 denotes a grid (or a mesh). The height and the element size of the grid can be changed depending on setting values. Numeral 64 denotes a movement effective range of the nozzle 16, which is defined by environmental setting. Numeral 65 denotes the origin of the nozzle 16. Numeral 66 is a compass indicating the direction of the three-dimensional space which is currently displayed. Numeral 67 denotes a tool bar which contains, for example, an icon for changing the viewing point to display the 3D-display screen 73, and an icon for calling a debug tool. Numeral 68 is an icon for calling the 3D-display screen 73. The 3D-display screen 73 can be called by selecting one item in a channel list displayed in a frame on the left side of the screen and pressing the icon.

The design concept of the moving program 100 will be described below.

In general application apparatuses including the application apparatus 50 in this embodiment, application work is performed by moving the moving head (application head) and the table holding the workpiece thereon relatively to each other. When the moving program 100 for performing such application work is prepared, it is effective to classify the operation of the application apparatus as follows; (A) approach operation from the origin of the application robot to the workpiece (i.e., operation up to the application start point on the workpiece), (B) operation of applying the liquid material onto the workpiece, and (C) retreating operation from the workpiece to the origin of the application robot. Herein, it is important that the operations (A) and (C) are defined on the basis of "absolute coordinates" and the operation (B) is defined on the basis of "relative coordinates".

For example, the programming work on the figure entry screen 72 using Gerber data corresponds to programming for the operation classified to (B), and therefore the moving program 100 is prepared on the basis of relative coordinates. In other words, by preparing the moving program 100 on the basis of relative coordinates for a workpiece image displayed on the background, the programming work can be performed with no need of considering the positional relation of the workpiece 19 relative to the origin of the application robot 10. The thus-prepared moving program 100 of the group (B) is coupled with the moving programs 100 of the groups (A) and (C) on the basis of the application start point indicated by absolute coordinates. Stated another way, in the moving program 100 of the group (B), only the application start point is indicated by absolute coordinates, and subsequent work is indicated by relative coordinates. Such a process is described below in connection with a practical example.

Figure 11:
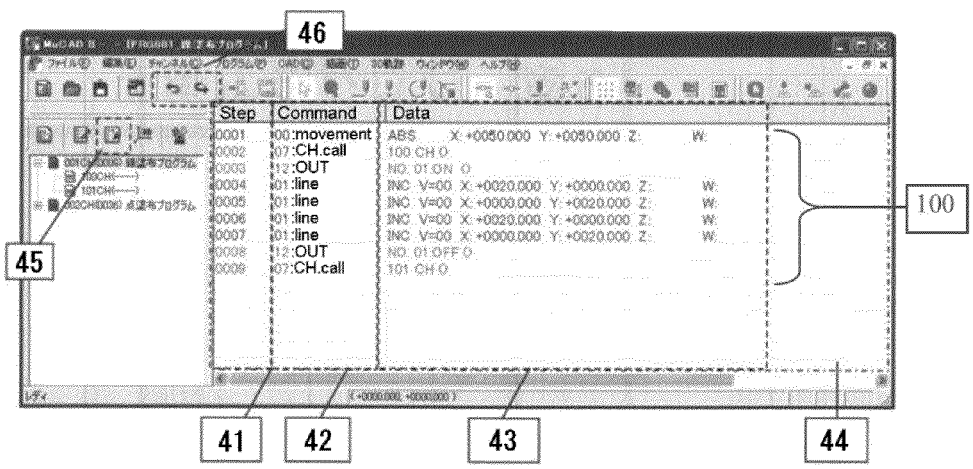
FIG. 11 illustrates a screen dump example of a text screen according to Embodiment 1.

FIG. 11 illustrates a screen dump example of the text entry screen 71 in accordance with the adapted CAD program in this embodiment. In FIG. 11, numeral 41 denotes a STEP column in which lines of the moving program 100 are indicated. Numeral 42 denotes a command column in which commands for the movements, the application, etc. are input. Numeral 43 denotes a data column in which concrete numerals representing the movements, the application, etc. are input. Numeral 44 denotes a column of a program list which is constituted by the STEP column 41, the command column 42, and the data column 43. Numeral 45 denotes an icon for calling the text entry screen 71, and numeral 46 denotes an undo/redo icon.

The moving program 100 shown in FIG. 11 is made up of nine Steps as follows:

First, in STEP1, the moving head 11 is moved from the origin of the application robot 10 to the application start point (X,Y)=(50, 50) in accordance with a "movement" command.

Then, in STEP2, a sub-channel 100 CH is called. The sub-channel 100 CH means a subroutine-like program and describes a series of operations for lowering the moving head 11 to such an extent that the clearance between the workpiece 19 and the moving head 11 becomes a desired distance.

STEP3 provides a discharge start signal. A first flag is set to turn ON a first port in accordance with an "OUT" command. Herein, the first port serves as a discharge signal port for the dispenser controller 20. When the first port is turned ON, a solenoid valve is opened and a pressure is supplied to the syringe 15, thus starting the discharge of liquid material.

In STEP4, the moving head 11 positioned at (X, Y)=(50, 50) is moved toward (X, Y)=(20,0) at a speed V=0 in accordance with a "line" command. Herein, the "movement" command in STEP1 and the "line" command in STEP4 differ in the operation of the application robot 10 in spite of both the commands instructing the moving head 11 to move. More specifically, the "movement" command instructs the so-called PTP (Point to Point) movement in which importance is focused on the movement from the current position to the designated position (coordinates) and a path of the movement is determined and decided by a controller (i.e., the control unit). On the other hand, the "line" command provides a movement path given by a "line" up to the designated position. Additionally, "ABS" in STEP1 means absolute coordinates, and "INC" in STEPs4-7 means relative coordinates. Each of the "movement" command and the "line" command has to designate either "ABS" or "INC".

Further, "speed V=0" does not mean that the moving head 11 is not moved, but it means that "speed No. 0" previously set in another dialog is applied. For example, when 250 mm/s is set to V=0, the moving head 11 is moved at 250 mm/s.

In STEP5-7, "line" commands are defined similarly to STEP4. Since the discharge of the liquid material is started in STEP3, the liquid material is continuously discharged in STEP3 to STEP7, whereby a desired drawing pattern is formed on the workpiece 19.

STEP 8 provides a discharge end signal. The first flag is cleared to turn OFF the first port in accordance with an "OUT" command. When the first port is turned OFF, the solenoid valve is closed and the supply of the pressure to the syringe 15 is stopped, whereby the discharge of the liquid material is brought to an end.

In STEP9, a sub-channel 101 CH is called. The sub-channel 101 CH describes a series of operations for elevating the moving head 11 and moving it to the origin position or a standby position for next application work, an operation for nozzle cleaning, etc.

The adapted CAD program of this embodiment for preparing the moving program 100 on the basis of the above-described design concept can be used to prepare a moving program that is applicable to application apparatuses having various structures, including, e.g., (1) an application apparatus of a structure performing application work such that an X-Y robot provided with an application head is freely moved on a stationary work table in the directions of length and width, (2) an application apparatus of a structure performing application work such that an application head is fixed to a beam extending between two posts and an X-Y table is freely moved under the beam in the directions of length and width, and (3) an application apparatus of such a structure, as in this embodiment, that an application head movable in the X-direction is mounted to a gantry frame disposed in a gate-like shape and a work table movable in the Y-direction is disposed under the gantry frame. Stated another way, according to the adapted CAD program of this embodiment, in any type of application apparatus so long as it operates by moving the application head and the workpiece relatively to each other, the moving program 100 can be prepared as a universal program on the basis of relative coordinates with no need of considering, for example, the structures of operation target components such as the application head and the table.

Management of the moving program 100 with the adapted CAD program of this embodiment will be described below. With the adapted CAD program, a plurality of prepared moving programs 100 are managed in units of channel. For example, one unique channel number is assigned to a moving program 100a for drawing the pattern "M", and another unique channel number is assigned to a moving program 100b for drawing a pattern "N". By inputting the channel number, the desired moving program 100 can be called. Further, an execution time can be calculated in units of channel.

Channel data is stored in a main storage device or an auxiliary storage device (such as a hard disk or a flash memory) of the computer 30. However, the computer 30 may be set so as to store the channel data directly on a recording medium, e.g., FD, DVD or MO. Of course, the stored moving program 100 may be called and edited with the adapted CAD program.

In work performed on the figure entry screen 72, the channel number of the moving program 100 is displayed in relation to a figure drawn on the drawing entry screen 76. For example, characters "C101" displayed near the drawing start point 81 in FIG. 3 indicate that a "101" channel is called at the drawing start point 81. When the "101" channel is called, the moving program 100 corresponding to the "101" channel is executed.

Characters "C102" displayed near the drawing end point 85 indicate that the moving program 100 corresponding to a "102" channel is called at the drawing end point 85. By correlating a plurality of channels with the individual moving programs in such a manner, drawing with the application of the liquid material can be performed in combination of predetermined drawing patterns.

Working efficiency can be increased by registering, as channels, routine drawing patterns which are used at high frequency, and by managing each of the registered drawing patterns as a component.

The drawing patterns can be correlated with the channels on the text entry screen 71 or the figure entry screen 72. Correlation information of the channel data, which is input on one of the two entry screens, can be confirmed on the other entry screen.

For the drawing pattern shown in FIG. 3, a "1" channel (not shown) is also executed in addition to the "101" channel and the "102" channel which are shown. The "1" channel is a main program, and the "101" channel and the "102" channel are subprograms corresponding to the "1" channel. One set of application work completed by those three channels is managed as a project. Prepared projects are stored in the main storage device of the computer 30.

Figure 12:
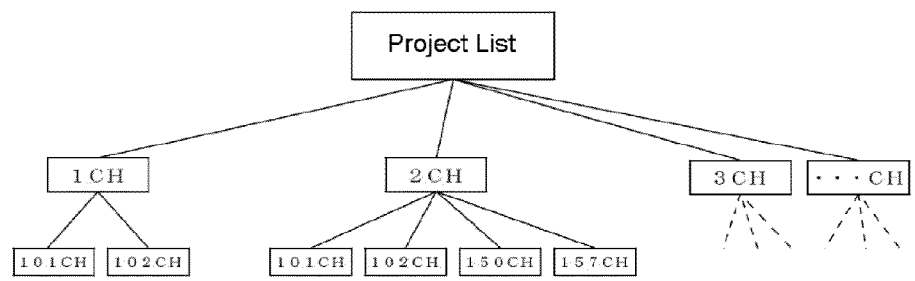
FIG. 12 illustrates a tree representing the correlation between a project list and channel data according to Embodiment 1.

A plurality of projects are managed, as shown in FIG. 12, in the form of a project list. Each of "1 CH (channel)", "2 CH", and "3 CH" represents a main program. Channels shown as being dangled from each main program represent sub-channels which function as subprograms corresponding to each main program. It is seen from FIG. 12 that "101 CH" and "102 CH" are subprograms used in both "1 CH" and "2 CH". The project list can be confirmed on a project list screen 74.

Figure 13:
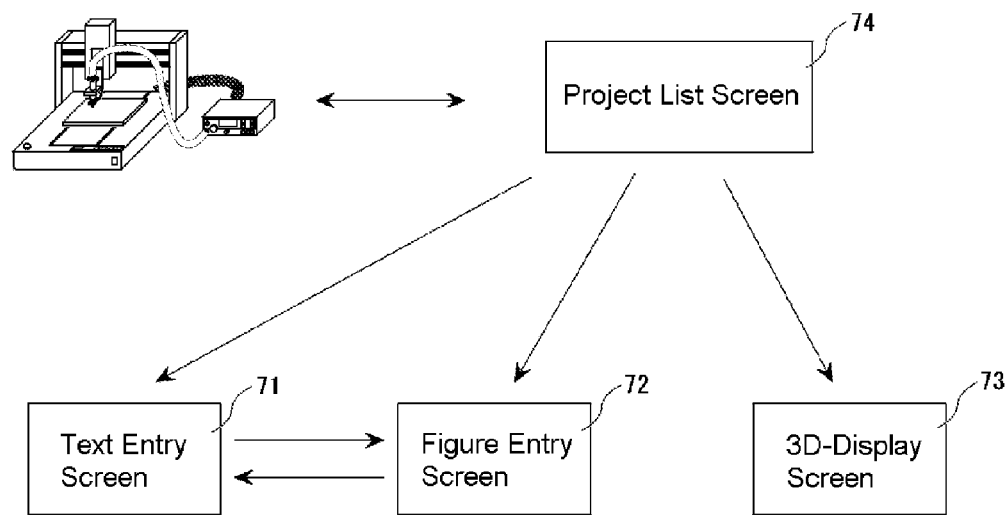
FIG. 13 illustrates screen transition among a text entry screen, a figure entry screen, a 3D display screen, and a project list screen according to Embodiment 1.

FIG. 13 illustrates screen transition among the text entry screen 71, the figure entry screen 72, the 3D-display screen 73, and the project list screen 74 in this embodiment.

Figure 14:
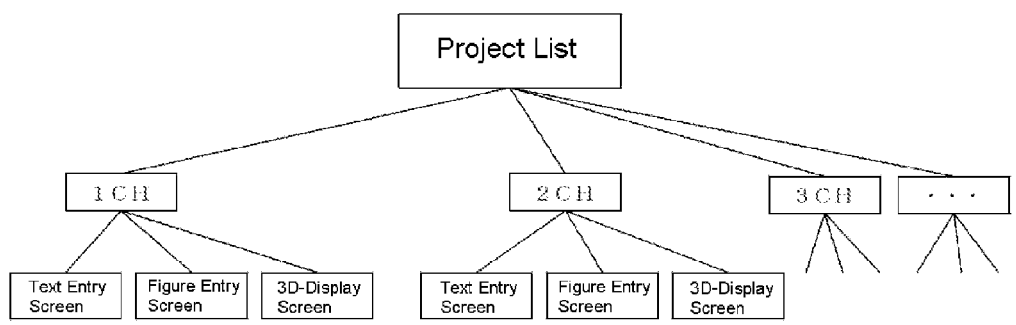
FIG. 14 illustrates a tree representing the correlation among the project list, the channel data, and the displayed screens according to Embodiment 1.

Further, the text entry screen 71, the figure entry screen 72, and the 3D-display screen 73 can be correlated with corresponding main channels, as shown in FIG. 14. While only the main channels are shown in FIG. 14, it is needless to say that the text entry screen 71, the figure entry screen 72 and the 3D-display screen 73 can also be correlated with corresponding sub-channels in a similar manner.

The project stored in the main storage device of the computer 30 is transmitted to the application robot 10 of the application apparatus 50. The project stored in the application robot 10 is executed upon receiving an instruction to start work from a control panel 99 of the application robot 10 through the cable A 51, or upon receiving a start-of-work signal from the computer 30.

The application robot 10 can also execute the application work in units of channel. In such a case, the moving program 100 transmitted in units of channel is stored in a main storage device of the application robot 10.

The adapted CAD program of this embodiment can be data-linked with a commercially available application program, such as EXCEL (registered trade mark). In other words, the moving program 100 can be automatically generated on the basis of coordinate values by reading data, such as CSV, including the coordinate values.

INDUSTRIAL APPLICABILITY

The present invention can be applied to not only an orthogonal desk-top working robot in combination of respective moving means in the XYZ-directions, but also to any type of working robot in which a workpiece and a working means are moved relatively to each other. For example, the working robot may be of the type the robot is movable only in one dimension, e.g., in the X-direction, or may be, e.g., a scalar robot which is moved along curves.

The gist of the present invention resides in displaying the distance between the working apparatus mounted to a holder and the workpiece in a visually recognizable manner so that the operator can easily determine whether the distance is appropriate. In particular, the present invention is highly advantageous in that the operator can confirm a plurality of working points at a time.

The invention claimed is:

1. A computer program product embedded in a non-transitory computer-readable storage medium for preparing a moving program of a working robot which performs desired work by moving a holder holding a working apparatus and a workpiece relatively to each other, the computer program product comprising:

a step of displaying a text entry screen on which movement information of the working apparatus can be input on a character basis;

a step of displaying a figure entry screen on which movement information of the working apparatus can be input according to an X-Y-Z coordinate system, the movement information being represented as a path on a two-dimensional X-Y plane indicating the movement of the working apparatus in the X-Y directions in correlation with height information corresponding to respective heights of the working apparatus in a Z-direction relative to points on the path on the two dimensional X-Y plane;

a step of outputting in real time the movement information of the working apparatus, which has been input on the text entry screen, as the path on the two-dimensional X-Y plane and the height information corresponding to the respective heights of the working apparatus in the Z-direction on the figure entry screen;

a step of outputting in real time the movement information of the working apparatus, which has been input on the figure entry screen, to the text entry screen on the character basis;

a step of displaying a 3D-display screen for outputting the movement information of the working apparatus, as a path on a three-dimensional space, on a basis of the movement information of the working apparatus which has been input on the text entry screen and/or the figure entry screen; and a step of automatically generating the input moving program for the working apparatus.

2. The computer program product according to claim 1, further comprising a step of enabling the path on the three-dimensional space and a path, which is resulted from projecting the path on the three-dimensional space onto a two-dimensional plane, to be both simultaneously displayed on the 3D-display screen.

3. The computer program product according to claim 1 or 2, further comprising a step of enabling the three-dimensional space displayed on the 3D-display screen to be rotated.

4. The computer program product according to claim 1 or 2, further comprising a step of outputting in real time the movement information of the working apparatus, which has been input on the text entry screen and/or the figure entry screen, as the path on the three-dimensional space on the 3D-display screen.

5. The computer program product according to claim 1 or 2, further comprising a step of displaying, on the figure entry screen, the height information of the working apparatus at two end points constituting one selected path in the forms of a scale axis indicating a height and a figure held in linkage with the scale axis.

6. The computer program product according to claim 5, further comprising a step of enabling the height information of the working apparatus to be changed by sliding the figure held in linkage with the scale axis.

7. The computer program product according to claim 1 or 2, further comprising a step of displaying desired image data as a background on the figure entry screen, and enabling the movement information of the working apparatus to be input on the displayed background.

8. An apparatus comprising a storage unit storing the computer program product according to claim 1 or 2, a display unit, an input unit, an information processing unit, and a data communication unit for transferring a prepared moving program to a working robot.

9. An apparatus comprising a storage unit storing the computer program product according to claim 3, a display unit, an input unit, an information processing unit, and a data communication unit for transferring a prepared moving program to a working robot.

10. An apparatus comprising a storage unit storing the computer program product according to claim 4, a display unit, an input unit, an information processing unit, and a data communication unit for transferring a prepared moving program to a working robot.

11. An apparatus comprising a storage unit storing the computer program product according to claim 5, a display unit, an input unit, an information processing unit, and a data communication unit for transferring a prepared moving program to a working robot.

12. An apparatus comprising a storage unit storing the computer program product according to claim 6, a display unit, an input unit, an information processing unit, and a data communication unit for transferring a prepared moving program to a working robot.

13. An apparatus comprising a storage unit storing the computer program product according to claim 7, a display unit, an input unit, an information processing unit, and a data communication unit for transferring a prepared moving program to a working robot.

* * * * *

UNITED STATES PATENT AND TRADEMARK OFFICE
CERTIFICATE OF CORRECTION

| | | |
|---|---|---|
| PATENT NO. | : 8,588,958 B2 | Page 1 of 1 |
| APPLICATION NO. | : 12/676461 | |
| DATED | : November 19, 2013 | |
| INVENTOR(S) | : Ikushima | |

It is certified that error appears in the above-identified patent and that said Letters Patent is hereby corrected as shown below:

On the Title Page item (22)

Change

"(22) PCT Filed: Apr. 9, 2008"

To

--(22) PCT Filed: Sep. 4, 2008--

Signed and Sealed this
Twenty-fourth Day of February, 2015

Michelle K. Lee
*Deputy Director of the United States Patent and Trademark Office*

UNITED STATES PATENT AND TRADEMARK OFFICE
CERTIFICATE OF CORRECTION

PATENT NO. : 8,588,958 B2
APPLICATION NO. : 12/676461
DATED : November 19, 2013
INVENTOR(S) : Kazumasa Ikushima It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 814 days.

Signed and Sealed this
Twenty-second Day of September, 2015

Michelle K. Lee
*Director of the United States Patent and Trademark Office*